Feb. 15, 1966  J. H. MARTIN  3,234,856
PROPULSION SYSTEM
Filed Jan. 31, 1964  5 Sheets-Sheet 1

NEUTRAL POSITION

INVENTOR.
JAMES H. MARTIN
BY

FULL FORWARD

FULL REVERSE

RIGHT TURN

LEFT TURN

INVENTOR.
JAMES H. MARTIN
BY

RIGHT TURN

INVENTOR.
JAMES H. MARTIN

United States Patent Office 3,234,856
Patented Feb. 15, 1966

3,234,856
PROPULSION SYSTEM
James H. Martin, Garden Grove, Calif., assignor, by mesne assignments, of seventy-five percent to James H. Martin, Garden Grove, and twenty-five percent to Frederick G. Space, Jr., Woodland Hills, Calif.
Filed Jan. 31, 1964, Ser. No. 341,621
4 Claims. (Cl. 91—413)

This invention relates to a hydraulic propulsion system especially adapted for marine applications. Heretofore, marine drive systems have fallen generally into two classes; namely, inboard motor actuation and outboard motor actuation, each having a mechanical drive between the motor and the drive props. The principal objections to an inboard motor system include less maneuverability, a need for centrally locating the engine in the craft, a need for aligning the inboard motor with the drive prop shaft, transmission of vibration from the motor to the prop, and the necessity for a rudder extending from the craft into the water for steering purposes. Most inboard motors have a drive shaft extending along the underside of the craft, which necessitates that special care be taken to prevent damage to the drive mechanism on loading the craft onto a trailer for transport. This construction also requires that dynamic rotating seals be provided about the openings in the hull, which seals are subject to deterioration from environmental and vibration effects. Therefore, the seals must be replaced eventually.

Outboard motors solve many of the above problems, but introduce problems of their own. In order to provide a high powered drive, the outboard engine must be relatively large in size. This increase in size has its practical limits, since large outboard units are bulky and difficult to manage and control. This practical limitation results in one using a plurality of outboard motors if increased power is desired, but this approach introduces further problems of alignment, speed control, and balancing problems.

Applicant's invention provides a novel system which combines the advantages of both inboard and outboard motor operation while removing the attendant disadvantages. One embodiment of the invention provides for an inboard drive motor with an actuated prop assembly attached in outboard fashion to the craft. Previous attempts at this approach have met with little success, primarily due to the fact that insurmountable problems were encountered in providing means to convey the power generated in the inboard motor to the props. Since the prior approaches utilized a mechanical drive, such as a rotating shaft, between the motor and prop, the numerous problems encountered were difficult to solve.

Applicant, however, provides a fluid drive between the motor and prop in a unique manner hereinafter more fully described. Provision is made for varying the power of the drive in a simple and efficient manner. Applicant further provides a unique means for controlling the direction of travel of the craft.

It is, therefor, an object of the invention to provide a new and improved hydraulic propulsion system which will overcome the objections and disadvantages of conventional drive arrangements.

A further object of the invention is to provide a hydraulic marine propulsion system having particular application in water craft.

Another object of the invention is to provide a marine drive system utilizing a single source of motive power in combination with a plurality of drive props.

A still further object of the invention is to provide a hydraulic marine propulsion system having an inboard motor and two outboard drive props with means for varying the speed of each or both of the props by varying the flow of fluid between the motor and the respective props.

Yet another object of the invention is to provide a novel steering mechanism for a craft which is highly efficient and reliable.

In general, the present invention involves an inboard motor and two prop drive means mounted on the stern of a boat. A hydraulic transmission is provided which includes a pump actuated by the inboard motor, a reservoir associated with the pump, and a differential valving mechanism connected in the fluid transmission line which controls the amount of fluid transmitted between the pump and the props. If the valving means is set so as to provide for equal amounts of fluid passage to the respective prop actuators, the craft will be propelled in a straight line. However, if an unequal distribution of the available fluid is made between the respective prop actuators, the craft will start to turn in one direction or the other, depending on which prop actuator gets the most fluid. This valving means is so constructed that one of the props can be made to rotate in a direction reverse to the other, whereby a very short turning radius can be achieved. If desired, both props can be reversed, allowing the craft to travel backwards, and still maintain steerability.

The invention will be better understood and the foregoing and other objects and disadvantages will become apparent as the description proceeds in connection with the particular embodiments shown in the accompanying drawings. It is to be understood, however, that the drawings are merely illustrative of the principles of the invention and are not to be considered as limiting the invention. Various changes may be made in the details of construction and arrangements of parts and certain features may be used without others, all such modifications within the scope of the appended claims being included in the invention.

Figure 1:
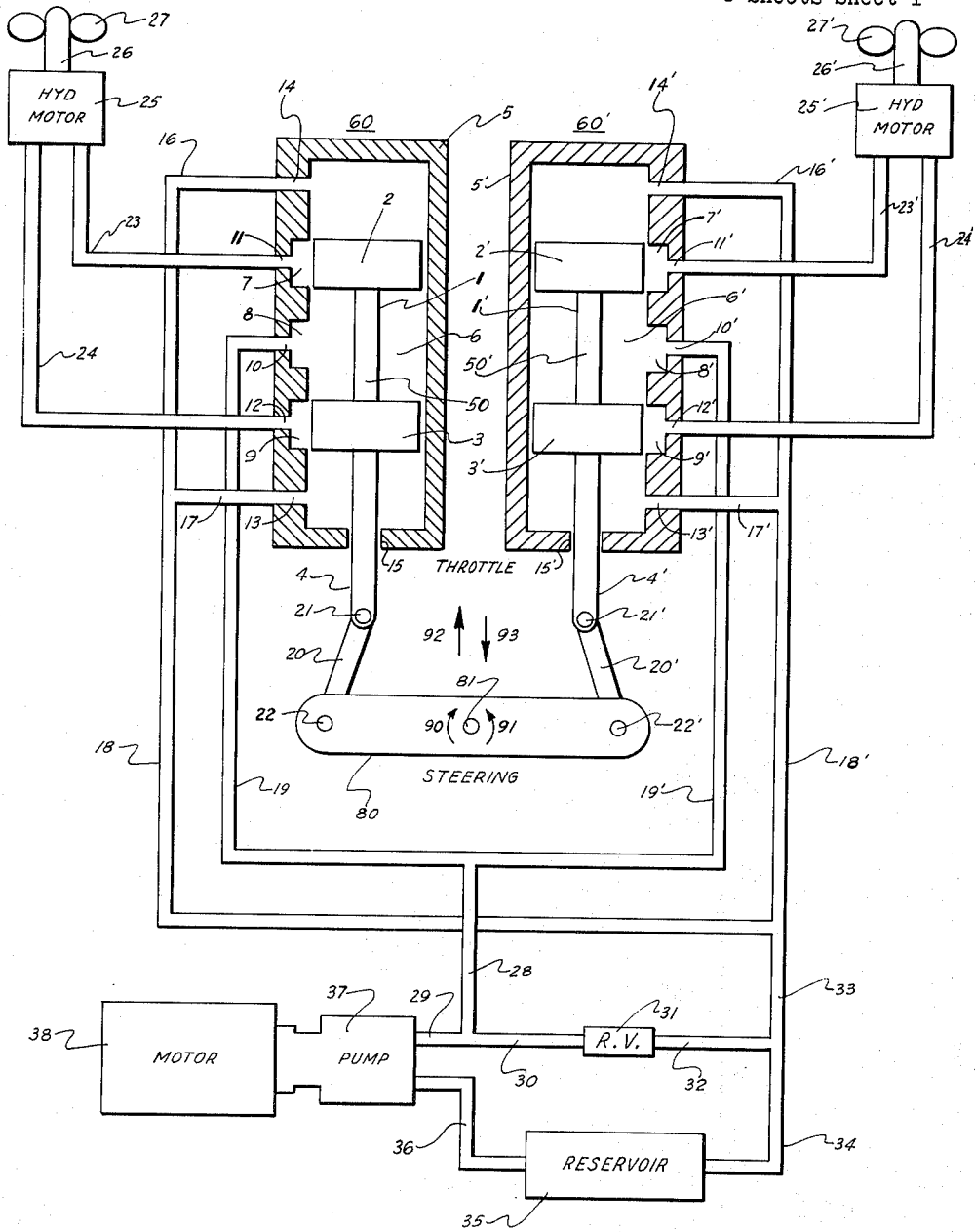
FIGURE 1 is a schematic representation of the fluid control system.

The invention generally consists of a fluid pump 37 driven by an appropriate source of motive power 38. Power source 38 can be an internal combustion motor, electrical motor, etc. Conduits, including lines 29, 28 and parallel branches 19 and $19^1$, connect the output of the pump to the differential valves generally indicated at 60 and $60^1$. The differential valve and motor control systems are substantially identical, and accordingly only one half of the system will be described in detail. Corresponding numerals are applied to the other half of the system.

Differential valve 60 includes a body 5 having an elongated cylindrical form with a hollow chamber 6 therein. A plurality of recesses 7, 8 and 9 are provided on the inside of body 5 which connects chamber 6 to openings 11, 10 and 12 respectively. Two further openings 13 and 14 in the body 5 are provided. Spool 1 includes an end land 2, an intermediate portion 50, end land 3, and extension 4. Spool 1 is journalled in opening 15 of body 5. Spool 1 is adapted to reciprocate in body 5 to alternately cover and uncover openings 10, 11, 12, 13 and 14 in a manner hereinafter more fully described.

Hydraulic motor 25 is provided, which transmits power to prop 27 via shaft 26. Hydraulic motors are well known in the art and will therefore not be described in detail. Conduit 23 connects opening 11 in valve body 5 to one side of the hydraulic motor 25. Conduit 24 connects opening 12 to the other side of hydraulic motor 25. Conduits 16 and 17 are respectively connected to openings 14 and 13 respectively, and are in turn connected to reservoir 35 via conduits 18, 33 and 34. The reservoir 35 is connected to the input side of pump 37 via conduit 36.

Extension 4 of spool 1 is pivotally connected to arm 20 by suitable pivot means 21. Arm 20 is in turn pivotally connected to actuator 80 by suitable pivot means 22. Spool $1^1$ is similarly connected to actuator 80.

Figure 7:
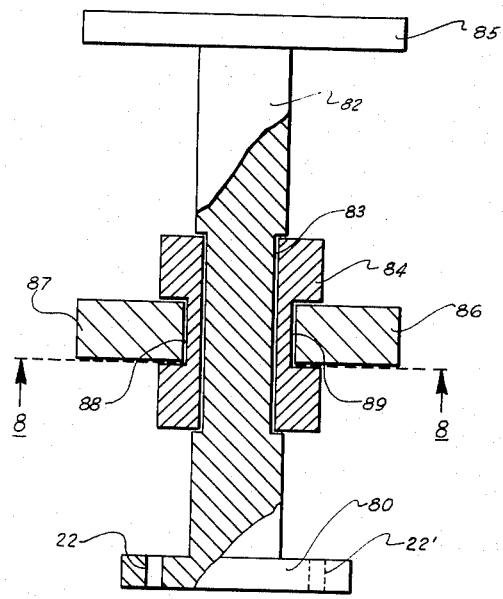
FIGURE 7 is a side view of the differential valve control mechanism.
Figure 8:
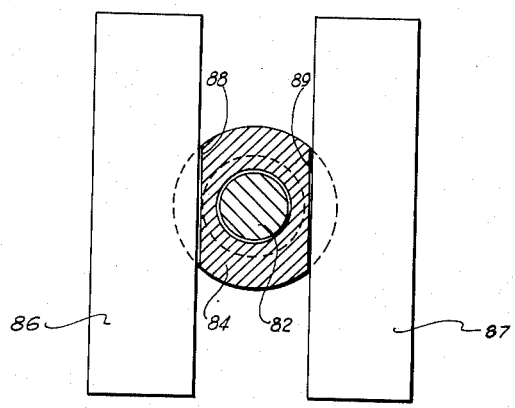
FIGURE 8 is a section taken through 8—8 of FIGURE 7.

FIGURE 7 is a showing of the actuator assembly and includes a steering wheel 85 attached to one end of steering shaft 82 and the actuator 80 is attached to the other end of steering shaft 82. The cylindrical groove 83 on shaft 82 is adapted to receive a collar 84. The collar 84 is provided with a plurality of longitudinally extending slots 88 and 89, which in turn receive stationary supports 86 and 87, as is more clearly shown in FIGURE 8.

The assembly of FIGURE 7 permits rotation of shaft 82 about its longitudinal axis. The assembly further permits movement of the shaft 82 in a direction perpendicular to its longitudinal axis. Since actuator 80 is integrally connected to shaft 82, actuator 80 is capable of the same relative movement. Therefore, actuator 80 is capable of rotation about an axis 81 as shown by arrows 90 and 91 in FIGURE 1, and is also capable of the back and forth movement as indicated by arrows 92 and 93 in FIGURE 1.

The power system further includes a relief valve 31 connected between line 29 and reservoir 35 by conduits 30, 32 and 34, which serves to relieve any excess pressure generated in output line 29 by bypassing it directly to reservoir 35.

Operation of the power system takes place as follows: The actuator 80 as shown in FIGURE 1 is in the neutral position. Fluid is applied under pressure from pump 37 via conduit 29 to lines 19 and $19^1$ which communicate with input openings 10 and $10^1$ of valves 60 and $60^1$. Spool 50 and spool $50^1$ are both in neutral positions and have their respective end lands 2, 3, $2^1$ and $3^1$ covering openings 11, 13, $11^1$ and $13^1$ respectively, thereby preventing the fluid under pressure to flow to motors 25 and $25^1$. The fluid, having no place to go, builts up its pressure to a point where it causes the relief valve to open, enabling the fluid to bypass the control system and return to the reservoir through conduits 30, 32 and 34. Since no fluid passes through the motors 25 and $25^1$, no rotation of the props 27 and $27^1$ takes place, and the vehicle remains stationary in the water.

Figure 2:
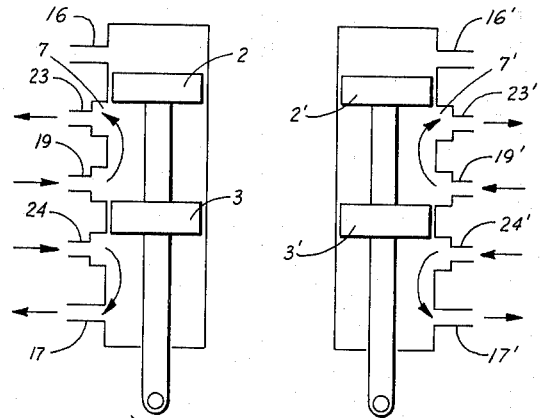
FIGURES 2–6 are schematic representations of the differential valving mechanism in a plurality of operative conditions.

If actuator 80 is not rotated, movement of actuator 80 either forward or backward will effect identical movement of valve 60 and $60^1$. In FIGURE 2, actuator 80 has been moved to a full forward position. Lands 2 and $2^1$ now uncover recesses 7 and $7^1$, and lands 3 and $3^1$ uncover recesses 9 and $9^1$. In this position, the fluid under pressure passes from line 19 to motor 25 via lines 23, 24 and returns to the reservoir 35 via lines 24, 17, 18, 33 and 34. The fluid under pressure travels through an identical path past valve $60^1$. Since there is an equal division of fluid under pressure applied to motors 25 and $25^1$, each prop rotates at an identical speed, causing the craft to travel forward in a straight line. It is readily apparent that the speed of the craft in a forward direction is a function of the forward movement of actuator 80. Movement of actuator 80 forward thereby provides a forward "throttling" function. The degree that recesses and 7 and $7^1$ are uncovered determines the amount of fluid transmitted to motors 25 and $25^1$, and consequently determines the speed of the craft.

Figure 3:
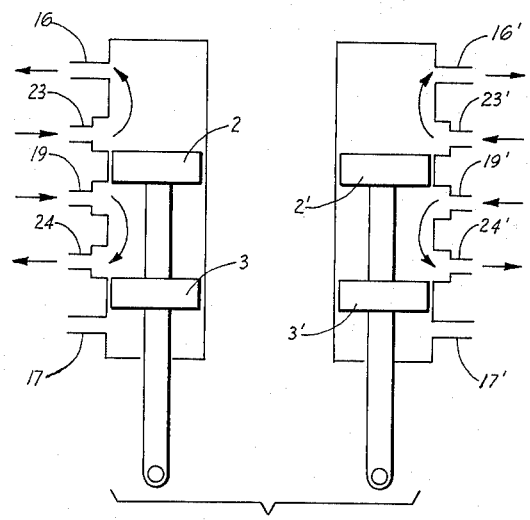

The craft can be propelled backward by moving actuator 80 backward as shown in FIGURE 3. In FIGURE 3, actuator 80 has not been rotated but has been moved backward from its neutral position. Fluid under pressure enters by way of conduit 19, passes out conduit 24 to motor 25, and returns to reservoir 35 via conduits 23, 16, 18, 33 and 34. Equal division of fluid flow takes place, enabling motors 25 and $25^1$ to rotate at identical speeds, but in a reverse direction. The net result is movement of the craft in a reverse direction in a straight line. The speed of the craft in a reverse direction is a function of the reverse movement of actuator 80 from its neutral position.

From the above, it is apparent that an equal division of fluid flow under pressure is passed to motors 25 and $25^1$ so long as actuator 80 is not rotated. Equal division of flow necessarily results in equal speeds of rotation of props 27 and $27^1$.

Figure 4:
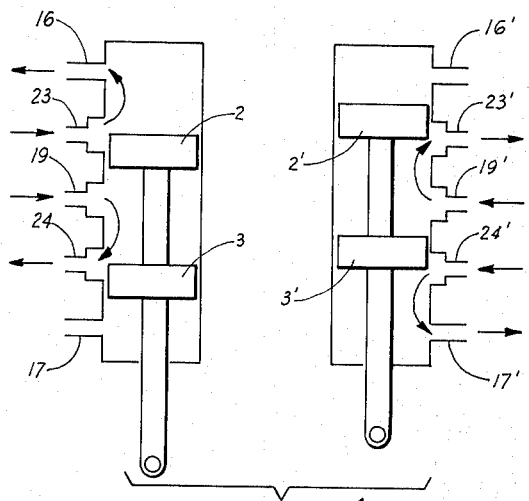

Turning of the craft to the right or left is achieved by rotation of actuator 80 clockwise or counter-clockwise. In FIGURE 4, actuator 80 has been rotated counter-clockwise, as indicated by arrow 91, with its axis 81 remaining in a neutral position. In this position, fluid passes from line 19 to motor 25 by line 24 and back to reservoir 35 via lines 23, 16, 18, 33 and 34. Fluid also passes from line $19^1$ to motor $25^1$ via line $23^1$ and returns to reservoir 35 via lines $24^1$, $17^1$, $18^1$, 33 and 34. This results in motors 25 and $25^1$ being driven at the same speed but in reverse direction, thereby causing the craft to turn to the right.

Figure 5:
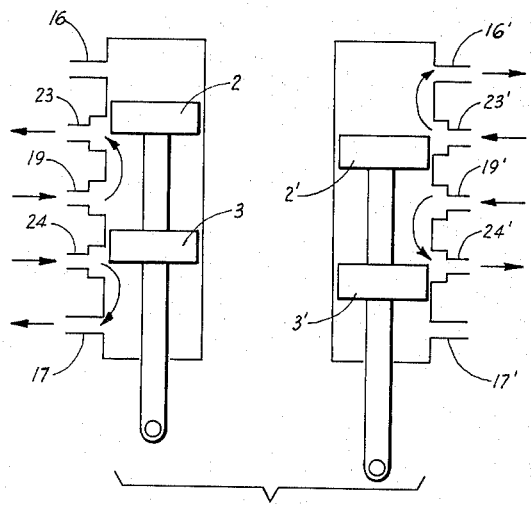

If actuator 80 is rotated clockwise with axis 81 maintained in a neutral position as shown in FIGURE 5, the craft will turn to the left. In this position, fluid passes from line 19 to motor 25 via line 23 and back to reservoir 35 via lines 24, 17, 18, 33 and 34. Fluid also passes from line $19^1$ to motor $25^1$ via line $24^1$ and returns to reservoir 35 via lines $23^1$, $16^1$, $18^1$, 33 and 34. Again, the motors are rotating at equal speeds but in a reverse direction, thereby causing the craft to turn to the left.

Figure 6:
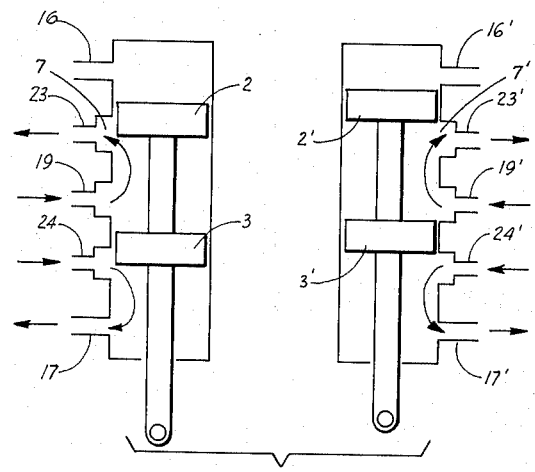

If the actuator 80 is simultaneously moved forward and rotated counter-clockwise, the spools 50 and $50^1$ will assume the position shown in FIGURE 6. In this position, the props 25 and $25^1$ will rotate in the same direction but at different speeds of rotation, since recess $7^1$ is completely uncovered and recess 7 is only partially uncovered. Due to the uneven speed of rotation, the craft will move forward and to the right. Moving the actuator 80 forward and clockwise will similarly cause the craft to move forward and to the left.

Since a finite amount of fluid under pressure is developed in the system, any increase in the supply of fluid to one motor will result in a decrease in the fluid supplied to the other motor, if the spools are in different respective positions. The valves 60 and $60^1$ together perform a differential valving function. Applicant's invention enables differential control of a plurality of motors by operation of a single control means—the actuator 80.

Applicant has shown one embodiment of his invention. The concepts disclosed and principles enumerated therein are applicable to other and different embodiments of the invention. Fluid can be used in a gaseous as well as liquid state without departing from the scope of the invention. The relative positions of the differential valves and actuator can be varied without falling outside the scope of the invention. Various other motive means, such as fluid jets, wheels in the case of land vehicles, etc., can be substituted for the hydraulic motors shown in the present embodiment. Furthermore, the invention need not be used as the prime source of motor power, since it might be used as a secondary control system in combination with other prime propulsion systems. In view of these considerations, applicant intends to limit his invention only to the scope of the appended claims.

I claim:
1. In a hydraulic propulsion system including an engine, pump, distribution system, and hydraulic motors, the improvement comprising a unitary control device capable of simultaneously controlling forward and backward movement, turning and speed, wherein said unitary control device includes a differential valve means having a first valve capable of controlling the flow of fluid under pressure to a first hydraulic motor in a forward and reverse direction and a second valve capable of controlling the flow of fluid under pressure to a second hydraulic motor in a forward or reverse direction.

2. In a hydraulic propulsion system including an engine, pump, distribution system, and hydraulic motors, the improvement comprising a unitary control device capable of simultaneously controlling forward and backward movement, turning and speed, wherein said unitary control device includes a differential valve means having a first valve capable of controlling the flow of fluid under pressure to a first hydraulic motor in a forward and reverse direction and a second valve capable of controlling the flow of fluid under pressure to a second hydraulic motor in a forward or reverse direction, said unitary control devices being connected to said first and second valves and having three degrees of movement.

3. A propulsion system comprising pump means to generate a finite amount of fluid under pressure, a first and second hydraulic motor adapted to be energized by said fluid under pressure, differential valve means adapted to divide the flow of fluid under pressure to the first and second hydraulic motors, and a unitary control device capable of simultaneously controlling forward and backward movement, turning and speed, said differential valve means being capable of controlling the flow of fluid under pressure to said first and second hydraulic motors in a forward or reverse direction, wherein said unitary control device includes an actuator connected to said differential valve means and capable of controlling the amount of fluid flowing to each respective hydraulic motor, as well as the direction of flow through each respective motor.

4. A hydraulic propulsion system for a marine vehicle comprising an engine, a fluid pump driven by said engine and adapted to generate a supply of fluid under pressure, a first and second hydraulic motor, a first valve and a second valve, conduit means connecting said pump to said first valve and said second valve for supplying fluid under pressure thereto, conduit means coupling said first and second valves to said first and second hydraulic means, return conduit means connecting said first and second valves to said pumps, an actuator having a movable pivot point and capable of rotation about said pivot point, means for connecting said actuator to said first and second valves, whereby movement of the pivot point of said actuator results in an equal increase or decrease in the amount of fluid passed to said first and second hydraulic motors, and rotation of said actuator about said pivot points simultaneously increases the amount of fluid passed to said first hydraulic motor and decreases the amount of fluid passed to said second motor.

References Cited by the Examiner
UNITED STATES PATENTS

| | | | |
|---|---|---|---|
| 2,807,935 | 10/1957 | Lapsley | 60—53 X |
| 2,818,125 | 12/1957 | Vogelaar | 180—6.48 |
| 2,949,971 | 8/1960 | Cline | 180—66 X |
| 2,953,164 | 9/1960 | Haberland et al. | 91—413 X |
| 3,114,424 | 12/1963 | Voreaux et al. | 60—53 X |

EDGAR W. GEOGHEGAN, *Primary Examiner.*
SAMUEL LEVINE, *Assistant Examiner.*